March 10, 1959 — P. T. NICKSON — 2,876,646
DITHER MECHANISM
Filed Oct. 14, 1955

INVENTOR.
PHILIP T. NICKSON
BY
AGENT

United States Patent Office 2,876,646
Patented Mar. 10, 1959

2,876,646

DITHER MECHANISM

Philip T. Nickson, Norfolk, Mass., assignor to the United States of America as represented by the Secretary of the Air Force Application October 14, 1955, Serial No. 540,653

5 Claims. (Cl. 74—42)

This invention relates to a device for mechanizing a function and provides means for "dithering" or varying the output over a range of the function. The invention is characterized by the provision of a function linkage or harmonic transformer in combination with a linkage adder and a dither mechanism whereby the linkage adder may be driven by either the function linkage or the dither mechanism.

An object of the invention is the provision of a dither mechanism with an eccentric shaft capable of high speed operation which improves on cam operated devices in that the device may easily be made adjustable and the necessity for spring loading is eliminated Another object of the invention is the provision of a dither mechanism with means for varying the input function.

Another object of the invention is the provision of a dither mechanism of a high degree of accuracy with a minimum of backlash.

Another object of the invention is the provision of a dither mechanism suitable for use with a radar set whereby the mechanism is capable of use for both searching and jamming operations. Other objects and features of the invention will become apparent from the following description and claims together with the drawings wherein:

Figure 1:
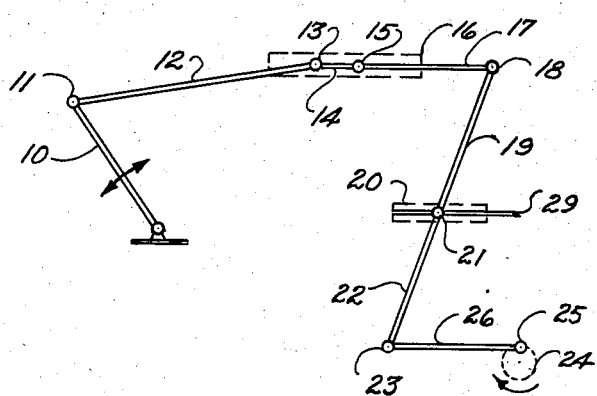
Fig. 1 is a schematic showing of the device.

The device basically consists of a crank 10 which serves as an input of a function linkage or harmonic transformer by means of a pivot joint 11. The function linkage, which makes the crank oscillation linear with frequency, consists of link 12 connected at one end to the input 10 and its other end to a pivot 13. A connecting link 14 joins pivot 13 to adder pivot 15. Both of said pivots 13 and 15 are constrained to a straight line motion in a slide 16 and are connected to an output link 17 which is connected by means of a pivot 18 to a linkage adder 19 whose center point is constrained to a straight line motion by a slide 20 with a pivot 21. The pivot 21 represents the output of the device and provides a tie point for a linkage 29 for varying a Klystron or other oscillator (not shown). The portion 22 of link 19 is connected to a dither device by means of a pivot 23. Said dither device constitutes an eccentric 24 which is pivotally connected at 25 to adder link 26.

For a search operation crank 10 is cycled at a low rate while eccentric 24 is locked in the position shown in Fig. 1, or if the eccentricity is small, at a diametrically opposite position; therefore, the motion of the crank will be transmitted through the function linkage to the linkage adder and thereby vary the output of an oscillator of a radar set.

Figure 2:
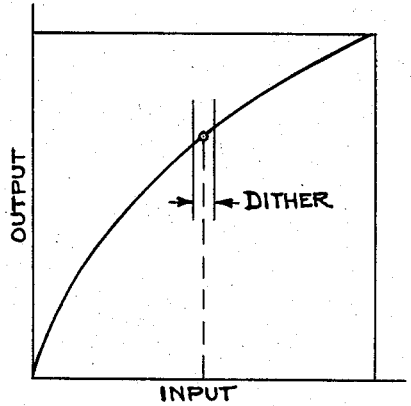
Fig. 2 shows a representative function that might be mechanized and indicates a dither region.

For operation as a jamming device, the crank 10 is set to a desired frequency and held in position while the eccentric is actuated at a high rate. The result is a sinusoidal sweep through the range shown in Fig. 2.

The accuracy of the device is dependent on maintaining the linear dimensions, i. e., the crank length, link length, shaft center, slide position, etc. By making the device adjustable, variation in parameters and differences in Klystron or oscillator characteristics may be accommodated.

Figure 3:
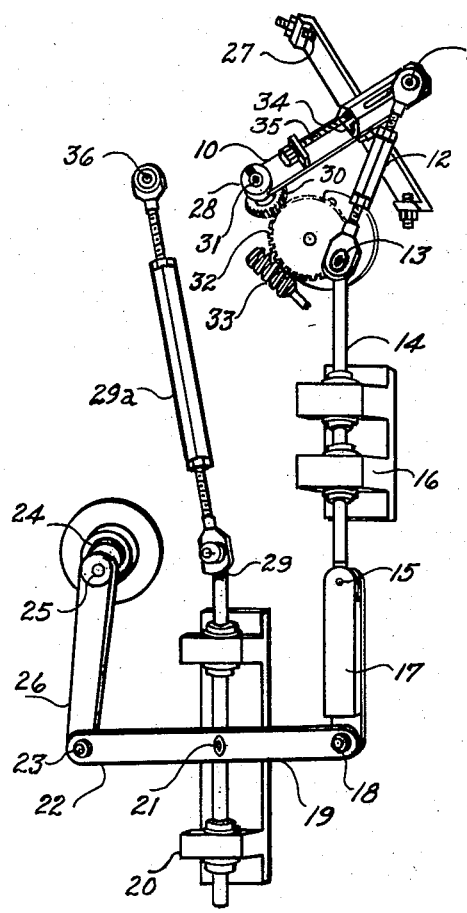
Fig. 3 is a view of constructional embodiment of the device.

In Fig. 3 a construction of the device embodying the schematic showing of Fig. 1 is presented wherein the same numerals designate like parts. An example of a drive means for the crank is illustrated wherein gear 30 with an integral hub or shaft 31 is driven by gear 32. For illustration purposes, a locking of the gear 32 is achieved by driving it with worm gear 33, while a conventional locking pawl (not shown) which can releasably engage a groove in the drive shaft for the eccentric provides locking for that element. Adjustable stop members 27 are provided to limit movement of crank arm 10 while a split collar 28 and bolt tightening means are used for adjusting the angular relation of the crank arm for variations in function. In addition, the links 12 and 29a may be adjustable, for example, by using a turnbuckle type link while adjustability of the crank radius may be achieved by placing pivot 11 on a slide 34 with a lock screw 35 for locking it in various positions on arm 10.

When the mechanism is used in conjunction with a radar set, both the input gear 32 and dither shaft (not shown) which drive the link 10 and eccentric 24 respectively, are connected to a servo-system for their operation while link 29a is attached to a Klystron plunger or other oscillator tuning mechanism. The turnbuckle arrangement of link 29a provides for zeroing adjustments for variations in Klyston characteristics while the self-aligning bearing 36 represents an attaching means to the Klystron plunger.

In order to minimize backlash and maintain a high degree of accuracy, ball-bushings are used in the slides while miniature radial-bearings, pivot bearings and self-aligning bearings are used in the various linkage joints.

Although the present invention has been described with reference to a particular embodiment, it will be understood to those skilled in the art that the invention is capable of a variety of alternative embodiments within the spirit and scope of the appended claims.

I claim:

1. In a device for mechanizing a function, an input crank arranged to be oscillated through a predetermined angle, means for locking said crank in any of its angular positions, a link pivoted at one end to said crank, means constrained to a straight line motion and connected to the other end of said link, a lever having an output point along its length which is constrained to a straight line motion, a second link connecting said means to one end of said lever, and means connected to the free end of said lever to vary the output over a small range when said input crank is locked in position.

2. A device as defined in claim 1 wherein said last mentioned means comprises an eccentric.

3. In a mechanism for tuning an oscillator through a frequency range, a linkage comprising an input means and an output means, one of said means being a rotatively actuated link and the other of said means being a translatory actuated link, a connecting member attached to said input and output means, locking means acting on one of said links for locking said linkage in a predetermined orientation, a lever connected at one to be operated by the output of said linkage such that said end is oscillated by said linkage when said linkage is in operation and is locked when said linkage is locked, and means connected with the other end of said lever for oscillating said other end of said lever when said linkage is locked.

4. A device as defined in claim 3 wherein said lever has an output point along its length which is constrained to a straight line motion.

5. A device as defined in claim 3 wherein said means for oscillating comprises an eccentric.

References Cited in the file of this patent

UNITED STATES PATENTS

| | | |
|---|---|---|
| 965,348 | Weiland | July 26, 1910 |
| 2,328,466 | Krzenciessa | Aug. 31, 1943 |
| 2,381,227 | Richards | Aug. 7, 1945 |
| 2,551,825 | Cook | May 8, 1951 |
| 2,594,667 | Lytle | Apr. 29, 1952 |
| 2,831,555 | Strauss | Apr. 22, 1958 |

FOREIGN PATENTS

| | | |
|---|---|---|
| 613,686 | Great Britain | Dec. 1, 1948 |